May 21, 1963  F. A. DUNN  3,090,930
VARIABLE GYROMAGNETIC WAVE TRANSMISSION DEVICE
Filed Dec. 26, 1957
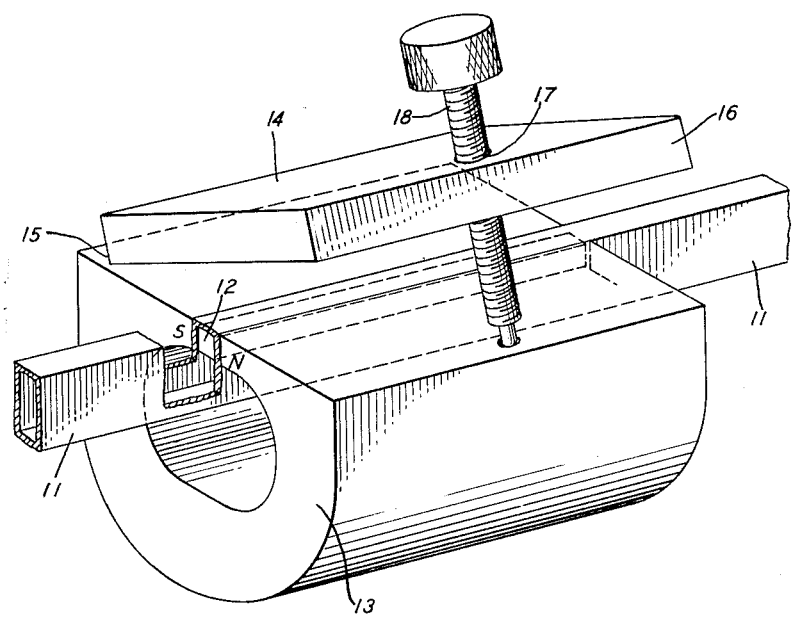
INVENTOR
F.A. DUNN
BY Ray M. Porter Jr.
ATTORNEY United States Patent Office 3,090,930
Patented May 21, 1963

3,090,930
VARIABLE GYROMAGNETIC WAVE TRANSMISSION DEVICE
Frank A. Dunn, Fairhaven, N.J., assignor to Bell Telephone Laboratories, Incorporated, New York, N.Y., a corporation of New York
Filed Dec. 26, 1957, Ser. No. 705,297
1 Claim. (Cl. 333—24.1)

This invention relates to gyromagnetic microwave devices and more particularly to means for rendering variable either the frequency of operation of these devices or the characteristics of their performance.

The use of ferrites and other gyromagnetic materials in wave guiding channels for microwave frequencies is now well known in the art. Nonreciprocal phase shifters, resonance isolators, resistance sheet field displacement isolators and the like, are treated extensively in microwave literature. In most practical embodiments of these devices a permanent magnet has been used to provide the magnetic field necessary for magnetically biasing the gyromagnetic material in order to obtain the phase shifting, attenuating, and other effects, characteristic of these devices. The usual means for biasing the gyromagnetic materials has thus provided a magnetic field of constant amplitude, in any given device. As a consequence, the operation of these devices has been limited in a manner dependent on the nature of the device. Thus, for example, in resonance isolators, or resistance-sheet field displacement isolators, the frequency at which the device exhibits gyromagnetic resonance or the frequency for which the device non-reciprocally provides an electric field null at the resistance sheet for one direction of propagation, depends upon the strength of the magnetic field biasing the ferrite. With a fixed magnetic biasing field any of these devices is operative solely at one narrow frequency band.

When magnetic biasing fields are utilized so as to magnetize ferrite devices with a magnetic field strength below that required to produce gyromagnetic resonance, ferrite devices will operate as phase shifters, providing an absolute shift in the phase of the energy transmitted. Alternatively, they may be used as differential phase shifters wherein two components of the transmitted wave energy have their phase varied relative to each other so as to provide interesting effects such as linear to circular polarization conversion. In these devices, the strength of the biasing field determines the amount of phase shift or differential phase shift provided. In general the greater the applied magnetic field the greater the phase shift resulting. In related fashion, a change in the operating frequency is analogous to changing the strength of the biasing magnetic field, since the amount of phase shift provided will of course be changed.

It may be seen therefore that the use of a fixed permanent magnet as the means for applying the biasing field to gyromagnetic material has certain disadvantages, e.g., in certain circumstances the device will be useable solely in a single narrow frequency band as in the case of resonant isolators, or will provide only one given fixed amount of phase shift as in the phase shifters operating in a narrow frequency band. Various means have been developed to broadband the operation of gyromagnetic devices such that for a given strength of magnetic biasing field, the frequency response of the device for whatever characteristic it provides will remain constant over a wide band of frequencies. Thus, when the operating frequency of a wave guide system is subject to unpredictable variation over a wide range, or constantly occupies a broad band, these broad-band devices are valuable. Where, however, at any given time the operation of the wave guide system is narrow band, even though the operating frequency may be changed at spaced predictable intervals of time, these broad-band devices constitute an unnecessarily elaborate and expensive solution to the problem of maintaining the response characteristic of the ferrite device constant despite change in frequency. To provide constant broad-band operation in a system which is essentially narrow band, but whose operating frequency may change at predetermined time intervals in inefficient. It will do the job, but it is more than is required. Furthermore, in the millimeter wave region the various types of wave guide loading used to provide broad-band operation often provide an undesirable degree of reflection and/or mode conversion.

It is an object of this invention to provide a variable magnetic field for biasing gyromagnetic wave guide devices so as to render their operation optimum at a plurality of operating frequency bands and/or to vary their performance characteristics at any given frequency.

In accordance with the invention, this object is achieved in an unusually simple and efficient manner. Consider a wave guiding channel supporting a gyromagnetic element. This element may be designed, for example, as a resonance isolator, resistance sheet field displacement isolator, phase shifter, etc. A permanent magnet is arranged about the wave guide, and the ferrite element supported therein, such that the two pole pieces of the magnet are on opposite sides of the ferrite element and define a magnetic path from pole to pole through the ferrite element which is transverse to the direction of propagation of wave energy through the wave guide. A magnetic field of fixed strength thus biases the ferrite element. This magnetic field of fixed strength is rendered variable in strength, in accordance with the invention, by means of a variable magnetic flux leakage path which shunts a portion of the magnetic flux from the direct path between the two pole pieces. Specifically, in accordance with an embodiment of the invention, a ferromagnetic plate is hinged at one pole piece solely by the magnetic force exerted by that pole piece. The other end of the shunting plate is spaced from the other pole piece by a distance which may be varied by a screw adjustment. Thus when the screw adjustment serves to rotate the plate about its magnetically hinged pivot at one pole piece, in the direction toward the other pole piece, the magnetic flux between the two poles is concentrated to a greater extent in the ferromagnetic shunting plate than previously. In this way, the magnetic flux passing directly through the ferrite element is now diminished in magnitude by virtue of the shunt path provided by the plate. As the unpivoted end of the plate is moved away from the pole piece, the concentration of magnetic flux is increased in the path including the ferrite element by virtue of the decrease in the magnetic flux shunted by the leakage path defined by the magnetic flux permeable plate.

In this way, for example, a resonance isolator may have its operating frequency, i.e., its resonant frequency, readily changed by screw adjustment which changes the strength of the magnetic field biasing the ferrite. Similarly, by way of example, the amount of phase shift provided by a ferrite phase shifter for a given frequency may also be varied.

A particularly desirable feature of this invention is its extreme structural simplicity. For example, no mechanical linkage is required between the pivoting end of the plate and the pole piece since the magnetic force of the pole piece will serve to hold that end of the ferromagnetic shunting plate. Similarly, the adjusting screw is kept in position by virtue of the magnetic field applied to the other end of the plate by the other pole piece. Thus ferrite wave guide devices now in use, utilizing a permanent magnet, may be converted to variable operation in accordance with the invention merely by shunting the magnetic path between the pole pieces by a magnetic flux leakage path in the manner taught herein. No physical or structural changes need be made to the ferrite wave guide device at all for the purpose of accommodating the flux leakage plate.

These and other objects and features of the present invention, the nature of the invention and its advantages will appear more fully upon consideration of the specific illustrative embodiment shown in the accompanying drawing and in the following detailed description. The drawing is a perspective view of a gyromagnetic wave guide device with a variable magnetic biasing field in accordance with the invention.

In more detail, FIG. 1 discloses a gyromagnetic wave guide device utilizing a permanent magnet whose strength is made variable in accordance with the invention. A microwave guiding channel comprising a hollow metallic pipe wave guide 11 of rectangular cross section is disclosed. Disposed within guide 11 is a schematic block representation of a gyromagnetic element 12. Gyromagnetic element 12 is represented in this way since it may function as any of a number of different devices, e.g., as a resonance isolator, in which case it would consist solely of a ferrite vane, or it might be a field displacement resistance-sheet isolator element, in which case it would consist of a ferrite vane upon one face of which is mounted a thin coating of resistive material, etc. These are merely illustrative of the types of gyromagnetic devices schematic block 12 might represent. There are others. However, they all are of the type which require a magnetic biasing field for the purpose of magnetizing the ferrite element transversely to the direction of propagation of wave energy through guide 11. This transverse magnetic biasing field is provided by permanent magnet 13 having pole pieces N and S disposed on opposite sides of guide 11 in the region of element 12. Thus the north pole is contiguous to one wide wall and the south pole is contiguous to the other wide wall of guide 11. Magnet 13 may be of any of the well known permanent magnetic materials; a particularly advantageous material of this type would be Alnico V. To provide the required magnetic biasing field strength for a ferrite device which may be of the resonance type operating at frequencies which may be in the millimeter range, a large permanent magnet is required, as indicated.

In this arrangement, it may be seen that the magnetic path thus far defined commences at the N pole piece, continues through a thickness of the wide wall of guide 11, thence through gyromagnetic element 12, through a thickness of the other wide wall of guide 11 to the S pole piece of the magnet and then, through the magnetic structure 13 back to the N pole piece. In this way an appropriate transverse magnetic bias is applied to gyromagnetic element 12. The arrangement thus far described would provide nonreciprocal attenuation for a particular frequency, or a given amount of phase shift for a particular frequency, or other effects depending upon the specific nature of gyromagnetic element 12.

A ferromagnetic plate 14, rectangular in shape, is disposed relative to this structure such that one end 15 of plate 14 is in direct contact with a portion of the south pole piece, and extends at an acute angle to the pole piece and the narrow wall of guide 11 such that the end 16 of plate 15 is located closer to the north pole piece than to the south pole piece. Disposed within plate 14 near end 16 thereof, is a threaded aperture 17. A nonferromagnetic machine screw 18 which may be, for example, of brass or other magnetically inert material, is disposed through threaded aperture 17. The threads of screw 18 are of the same size and pitch of the threads of aperture 17 such that they are meshed, whereby rotation of screw 18 results in movement of plate 14 up or down on the shaft of screw 18. In this arrangement, one end of screw 18 is in direct contact with the north pole piece of magnet 13. By virtue of the fact that end 15 of plate 14 is in direct contact with the south pole piece, end 15 is held in place at the south pole piece by magnetic force, without any mechanical attachments. Although screw 18 is magnetically inert, it is held in place at the north pole piece by virtue of the magnetic force applied by the north pole piece to end 16 of plate 14. Since the north pole piece attracts end 16, screw 18 meshed in the threads of aperture 17 is, of necessity, held in constant contact with the north pole piece. It may be seen, therefore, that rotation of screw 18 results in end 16 of plate 14 being raised or lowered relative to the north pole piece depending upon the direction of rotation of the screw. Accordingly, plate 14 may be brought closer to, or removed from, the magnetic path between the north and south pole pieces and through ferrite block 12.

Considering then the operation of the embodiment of the invention, it may first of all be seen that plate 14 itself constitutes a magnetic flux leakage path which shunts the N-12-S magnetic path. As a consequence, the rotation of screw 18 in the proper sense, so as to bring end 16 closer to the north pole piece, results in decreasing the amount of magnetic flux in the N-12-S path since some of the magnetic flux in the N-12-S path is shunted off by plate 14. Conversely, turning screw 18 such that plate 14 is rotated in a direction away from the N-12-S path results in an increase in the magnetic flux in the N-12-S path since less of the field is shunted off by plate 14. Accordingly, it may be seen that if screw 18 has a very small pitch to its threads, it is possible to have a very fine control over the strength of the magnetic field in path N-12-S, and thus over the strength of the biasing field magnetizing gyomagnetic element 12. In this way, a gyromagnetic device designed to operate at a given frequency can be utilized at other frequencies merely by an adjustment of the screw. Thus at high frequencies, in the case of a resonance isolator, a screw adjustment pivoting plate 14 away from the N-12-S path will provide a field strength in this path of greater magnitude which is appropriate for providing gyromagnetic resonance at the higher frequency. Similarly, at lower frequencies the screw may be adjusted to pivot plate 14 closer to the N-12-S path, thereby decreasing the magnetic flux in this path and biasing gyromagnetic element 12 at the appropriate resonance point for the lower frequency.

In one of several successful reductions to practice, the magnetic field strength biasing the ferrite element (i.e., the field strength in the N-12-S path) was made variable, by the magnetic flux leakage path shunting arrangement, from a value of 1,200 to 4,300 gauss. The value of 1,200 gauss was obtained when the ferromagnetic shunting plate 14 was resting directly on both the magnetic pole pieces to provide a minimum magnetic field in the N-12-S path.

It is of particular merit that the means for physically linking the magnetic flux leakage plate 14 and adjustment screw 18 to the main structure is completely devoid of mechanical coupling or hinging arrangements and relies solely on the magnetic field already provided by the magnet 13. As a consequence, fabrication of such a variable magnetic flux device is of maximum simplicity. Furthermore, any gyromagnetic wave guide device utilizing a permanent magnet for biasing purposes, which is currently in use either commercially or experimentally, can be readily modified to provide variable performance in accordance with the invention without any structural alterations in the basic design. All that is required is that a ferromagnetic plate with a magnetically inert machine screw penetrating the plate be placed in contact with the device as in the drawing.

Although this embodiment of the invention utilizes a magnetic biasing field directed transversely to the direction of propagation through the waveguide, it is clear that gyromagnetic devices using longitudinally directed magnetic biasing fields, such as Faraday rotators, may also be rendered variable in accordance with the invention. Thus, it may be seen that the above-described arrangement is simply illustrative of one of the many possible specific embodiments which represent applications of the principles of the invention. Numerous and varied other arrangements can readily be devised in accordance with these principles by those skilled in the art without departing from the spirit and scope of the invention.

What is claimed is:

A microwave guiding channel, an element of magnetically polarizable material coupled to said channel, said material exhibiting gyromagnetic properties at the frequency of wave energy supportable by said guiding channel; means for establishing a magnetic polarizing field through said element comprising first and second oppositely polarized magnetized pole pieces on opposite sides of said element; and a variable magnetic flux leakage path shunting said magnetic field, said flux leakage path comprising a plate of magnetic material, one end of said plate being hinged at one of said pole pieces by magnetic force, and a screw of magnetically inert material engaging a threaded aperture in said plate with one end of said screw in contact with the other of said pole pieces, whereby the distance of said plate from said other pole piece is variable by rotation of said screw in said threaded aperture to vary the magnetic field through said element.

References Cited in the file of this patent

UNITED STATES PATENTS

| | | |
|---|---|---|
| 2,798,205 | Hogan | July 2, 1957 |
| 2,806,972 | Sensiper | Sept. 11, 1957 |
| 2,820,951 | Jones | Jan. 21, 1958 |